Sept. 15, 1970  M. VON CLAVÉ-BOUHABEN ET AL  3,528,876
METHOD OF JOINING PLASTIC MATERIAL TO FORM MAIN
AND SECONDARY ADJACENT SEAMS
Filed Feb. 9, 1966
2 Sheets-Sheet 1

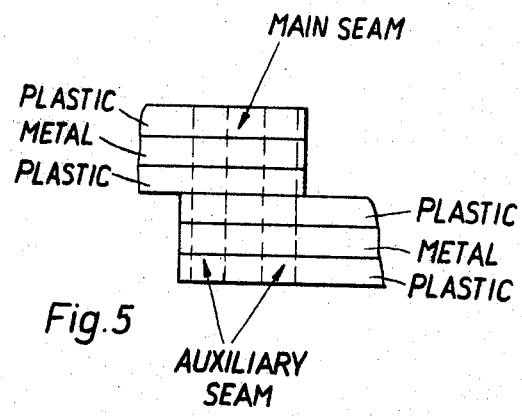
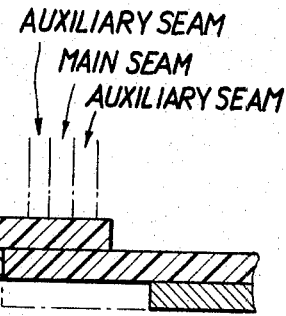
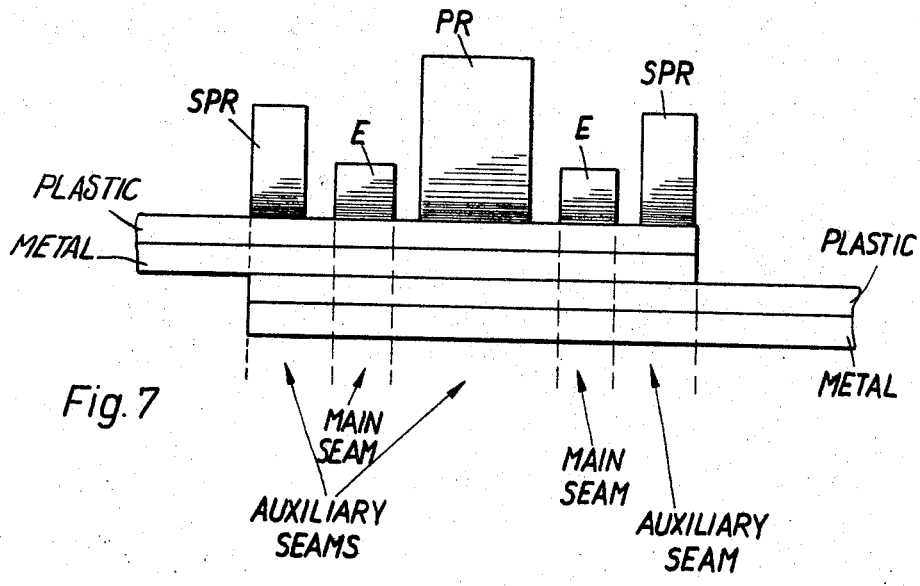

3,528,876
METHOD OF JOINING PLASTIC MATERIAL TO FORM MAIN AND SECONDARY ADJACENT SEAMS
Manfred von Clavé-Bouhaben, Berlin-Charlottenberg, and Hans Roemgens, Moenchengladbach, Germany; said Roemgens assignor to said von Clavé-Bouhaben and Rheinische Blattmetall Aktiengesellschaft, Grevenbroich (Lower Rhine), Germany
Filed Feb. 9, 1966, Ser. No. 526,151
Claims priority, application Germany, Feb. 12, 1965, R 39,892
Int. Cl. B29d 23/10; B32b 3/20
U.S. Cl. 161—139                18 Claims

ABSTRACT OF THE DISCLOSURE

A method of joining portions of fusible plastic material to one another. The portions are overlapped to a predetermined width. Heat is directly applied to a zone of the overlapped region which is narrower than the overlapped region to weld the portions together in this zone and form a main seam. Heat transfer from the main seam to the material adjoining the main seam results in placing this material into fusible state. This material adjacent the main seam but constituting part of the overlapping is maintained in contact so as to form a discrete secondary seam adjacent to the main seam.

---

The present invention relates to a method of joining plastic material. More specifically, the invention relates to a method of joining portions of fusible plastic material. Still more specifically, the invention relates to a method of joining juxtaposed portions of fusible plastic sheet material. The invention further relates to a novel article of manufacture obtained by joining portions of fusible plastic material in accordance with the method hereindescribed.

It is known to construct packages from plastic materials. Also used for this purpose are laminated foils in which a metal sheet is secured to a plastic sheet, or is sandwiched between two such plastic sheets, usually of the stretch oriented thermoplastic type. This latter laminated-foil material is particularly suitable for sausage casings because of its good resistance to rupturing. In constructing such sausage casings from foils of this type, the foils are usually formed into a cylindrical shape and their longitudinal edge portions are overlapped, whereupon the overlapped portions are heat-sealed to one another along a zone extending lengthwise of the overlapped portions.

However, such heat sealing brings with it a decided disadvantage, namely a weakening of the plastic material in a zone or zones adjacent to and along the heat-sealed seam. This is the result of a partial softening of the plastic material laterally along the heat-sealed seam, caused by heat-transfer from the seam to the adjacent material. During such softening the plastic material undergoes certain changes in this zone or zones adjacent the seam and, although it will solidify again when it cools, the changes caused by the softening remain. Thus, packages and particularly sausage casings constructed in this manner will always be weakest in the zones directly adjacent the heat-sealed seam.

This disadvantage is particularly pronounced in cases in which the sausage casing is constructed from the aforementioned laminated foils, in which a sheet of metallic material, such as aluminum, is bonded to a sheet of plastic material or is sandwiched between two sheets of such plastic material. The reason for this is the excellent heat-transfer afforded by the metallic layer so that heat from the seam is immediately transferred to the areas adjacent the seam where the thermoplastic material then is softened. If, for example, an aluminum foil is sandwiched between two molecularly oriented polypropylene sheets, a laminated construction which results in excellent tensile strength and breaking resistance, such tensile strength and breaking resistance will be lost as a result of conventional heat-sealing in an area adjacent to the heat-sealed seam, the width of this area being dependent upon the length of the sealing process and the temperature used. The width of the area may range, depending upon the aforementioned factors, between several tenths of a millimeter and several millimeters. It follows from this that by properly selecting the tools used for sealing, by keeping the duration of the sealing process short, and by utilizing an advantageous temperature it is possible to control and minimize the effects of heat-transfer to the area adjacent the heat-sealed seam. Thus, proper selection of these factors will make it possible to keep this area relatively narrow. However, it is not possible to eliminate the adverse effects completely, so that a package constructed in this manner will always have a weakened zone alongside the heat-sealed seam.

The major purpose of constructing packages, particularly sausage casings, from laminated foils of the above-mentioned type is, of course, the exceptional strength of such foils and of the resulting package. Obviously, then, it is extremely undesirable to have the very reason for the use of these materials impaired by the fact that weakened zones exist alongside the heat-sealed seam, thus seriously reducing precisely those strength factors which have caused selection of the material in the first place.

In fact, if oriented thermoplastic foils are used alone, that is if the foil is not of the laminated type as discussed earlier, the zones alongside the heat-sealed seam are often softened by heat transfer to the point where they will have more or less large perforations. Naturally, such a casing is completely useless. These problems are essentially also found in non-oriented thermoplastic foils, although to a somewhat lesser degree. Nevertheless, in such foils, also, the material in the zone adjacent the heat-sealed seam will soften, flow and upon cooling-off, will exhibit variations in thickness. Of course, wherever the thickness is less than the standard thickness of the material, a weakened area exists.

In view of the disadvantages of the prior art it is a general object of the present invention to overcome such disadvantages.

A more specific object of the present invention is to provide a method of joining thermoplastic materials.

A still more specific object of the invention is to provide a method of joining portions of fusible thermoplastic materials.

A concomitant object of the present invention is to provide a method of joining portions of one or more laminated foils which comprise one or more layers of thermoplastic materials bonded to at least one layer of metallic material.

It is also an object of the present invention to provide a novel article of manufacture, constructed in accordance with this method.

In accordance with one feature of the invention we provide a method of joining portions of fusible plastic material which comprises placing one of the portions in face to face contact with another of the portions so as to form a laminated structure. Thereupon, heat will be directly applied to a zone of the laminated structure so as to weld the portions together in this zone, and to thus form a main seam, whereby the material adjoining the main seam is simultaneously brought into fusible state by transfer of heat from the aforementioned zone. The material of the portions will be maintained in contact whereby to form a secondary seam adjacent to the main seam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 5 is a diagrammatic section through the seam area of a three-layer laminated structure in accordance with the present invention;

FIG. 6 is a fragmentary section through the seam area of a two-layer laminated structure; and FIG. 7 is a diagrammatic view of overlapped portions of a two-layer laminated structure in accordance with the present invention, and of an apparatus for heat-sealing the overlapped portions to one another.

Figure 1:
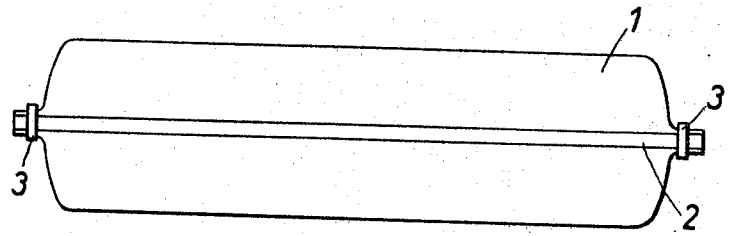
FIG. 1 is a somewhat diagrammatic side elevation of a sausage casing constructed in accordance with the present invention.

Discussing now the drawing in detail, and firstly FIG. 1 thereof, it will be seen that there is shown by way of an example how packages can be constructed with the inventive method, a sausage casing 1 of tubular configuration. This casing is constructed by rolling a foil into a tubular shape, overlapping its meeting edge portions, and sealing these edge portions to one another along a main seam 2. The ends of the casing 1 may then be closed off, for example by heat sealing, upsetting, twisting and/or by the use of suitable clips 3 of metal, plastic or other materials.

Figure 2:
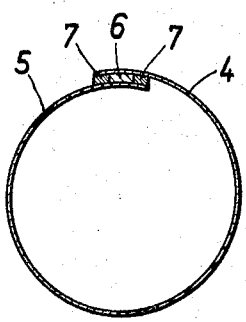
FIG. 2 is a diagrammatic section taken through a sausage casing of the type shown in FIG. 1.

Describing the invention in more detail on the basis of the exemplary embodiment of a package as shown in FIG. 1, it will be seen that in FIG. 2 the edge portions 4 and 5 of a single or laminated foil of the types discussed before are overlapped to a width which is substantially greater than the width of the main seam 6 along which the overlapped portions 4 and 5 are to be heat-sealed to one another. Heat sealing along the zone 6 produces on either side of this main zone a softening of the plastic material in two secondary zones 7 which extend alongside the zone 6. If the overlapped material is maintained in contact in these zones 7, it will be united upon cooling-off and the material will then be sealed together not only in the zone 6, but in the zones 7 to either side of the zone 6. In other words, the zones 7, which would ordinarily be weakened by heat transferred to them from the zone 6, are now strengthened by the fact that they are doubled in thickness and together they approach or exceed the strength characteristics of the main zone 6.

Figure 3:
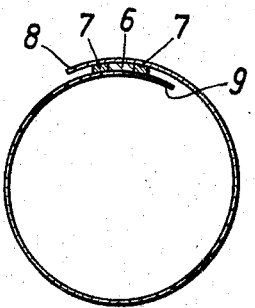
FIG. 3 is a view similar to FIG. 2, but showing a somewhat modified embodiment of the invention.
Figure 4:
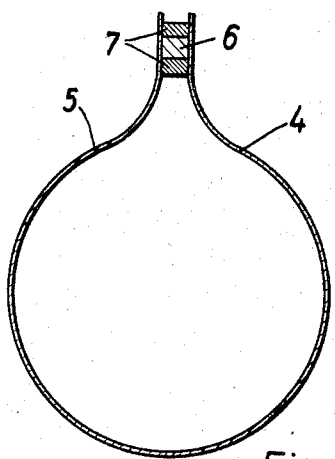
FIG. 4 is a view similar to FIGS. 2–3, again showing a modified embodiment of the invention.

The embodiment of FIG. 3 is substantially the same as the embodiment shown in FIG. 2, with the modification that the overlap is still greater than in FIG. 2, so that to either side of the zones 7 there extend flaps 8 and 9, respectively. These flaps represent a safety factor in that they guard against the possibility that the zones 7 might be unexpectedly wide and might actually extend into the adjoining material, whereby there would be created a weakened zone outwardly adjacent the zones 7. The presence of the flaps 8 and 9 prevents this since, if the zones are indeed wider than expected, all or part of the material of the flaps 8 and 9 will simply adhere to the material with which it is juxtaposed and the flaps will in such case partially or completely become a portion of the respective auxiliary seams 7.

Where FIGS. 2 and 3 show embodiments in which the outer surface of one edge portion is joined to the inner surface of the other edge portion of the same sheet, or of another sheet, FIG. 4 shows an embodiment in which the inner surfaces of both edge portions of the same or of two individual sheets are joined together. The reference numerals in this figure are the same as in FIGS. 2 and 3 and it will be seen that the relative position of the zones 6 and 7 are the same as those shown in the preceding figures. The difference in FIG. 4 is simply that the edge portions 4 and 5 are juxtaposed with one another in such a manner that their inner surfaces will face each other, rather than having the inner surface of one of the edge portions face the outer surface of the other of the edge portions. Heat sealing along the seam 6, and the formation of the auxiliary seams 7 on either side of the seam 6 is the same as in FIGS. 2 and 3.

Coming now to FIG. 5 it will be seen that what is shown there is a diagrammatic partial view of two overlapped edge portions. In the example of FIG. 5 it is assumed that a triple-layer foil consisting of a layer of metal sandwiched between two layers of plastic is to be used, and that the outer surface of one of the edge portions thereof is to be sealed to the inner surface of the other of the edge portions. The main seam and the auxiliary seams are indicated not by numbers, but by legends, and are shown in phantom lines.

FIG. 6 is a somewhat schematic fragmentary section through another embodiment which has been mentioned hereinbefore, namely a dual-layer foil consisting of a layer of plastic material bonded to a layer of metallic material. In this particular embodiment it is assumed that the metallic material is not coextensive with the plastic material so that, as is evident from FIG. 6, only overlapping edge portions of the plastic layer are to be joined, whereas the metal layer is not coextensive with the plastic material in these edge portions. Again, the main and auxiliary seams are indicated with legends. The phantom lines in FIG. 6 are intended to make it clear that in another embodiment of the invention the metal layer could in fact extend coextensively with the edge portions of the plastic material. In other words, it is contemplated, for instance, to have the metal layer cover both edge portions in which case it would be coextensive with the plastic material in the manner shown in FIG. 5, to have it be coextensive with the plastic material to the extent that it is juxtaposed with one of the edge portions thereof but is not coextensive with the other edge portion, or to have the metal layer not be coextensive with either of the edge portions, which will result in a construction as shown in FIG. 6 in which only the edge portions of the plastic layer alone are overlapped and sealed to one another.

Coming, finally, to FIG. 7, it will be seen that there is again shown an instance in which a foil consisting of a layer of metal bonded to a layer of plastic is to be joined by overlapping of its edge portions. The main and auxiliary seams are again designated with appropriate legends. FIG. 7 indicates, by way of example, an apparatus which can be utilized for effecting joining of the edge portions, and which will be discussed presently. At the same time, FIG. 7 is also intended, however, to illustrate yet a further embodiment in which the overlapped portions are relatively wide and are provided not with one main seam but with two spaced and, in this case, parallel main seams. As for the apparatus it will be seen that there is provided a large pressure roller PR and on either side of this large pressure roller PR there is provided a smaller pressure roller SPR spaced laterally therefrom. Intermediate the respective smaller pressure roller SPR and the larger pressure roller PR there are arranged roller electrodes E and it will be clear from the drawing that it is these roller electrodes E which produce the two main seams which are indicated by appropriate legends. The pressure rollers PR and SPR of course serve the purpose of maintaining the overlapped material of the edge portions in contact while the roller electrodes E produce the main seams. It is clear from a consideration of FIG. 7 that auxiliary seams will form on either side of the main seams, so that laterally outwardly of the main seams there are produced respective auxiliary seams, while intermediate the two main seams there is produced a combined auxiliary seam which is wider than the outermost auxiliary seams. This embodiment is of particular importance if relatively great internal pressures occur in a package which is constructed in this manner, since this type of seam is able to withstand such pressures.

The apparatus shown in FIG. 7 is by way of example only, of course. Instead of the pressure rollers PR and SPR it is also possible to simply guide the edge portions on which the auxiliary seams are to be formed into contact with one another without actually exerting pressure. Various suitable guide means are known for this purpose and need not be described here since they will readily offer themselves to those skilled in the art.

It is also to be understood that guide or other means used for this purpose may be cooled, if desired. Advantageously, the construction will be such that no heat can be transferred to the guide means or pressure rollers from the welding station.

The invention is of particular importance, as has been briefly touched upon before, for use in sausage casings or similar packages which are subjected to considerable pressures, in the case of sausage casings this being internal pressures. Sausage casings, as will be known, must be stuffed with the sausage meat, closed, and then sterilized. Particularly during such sterilization considerable pressure develops internally of the casing. Although this internal pressure is largerly neutralized by external pressure if a so-called "counterpressure autoclave" is used, pressure variations such as occur particularly during the cooling-off period, cannot be avoided and these can cause the internal pressures to rise to a point where they exceed the external counterpressure. Such pressures can be resisted by the material of the package only if the latter has no weakened portions or zones, and the present invention is able to eliminate such weak zones which previously resulted from the heat-sealing operation.

Materials suitable for use with the novel invention have already been discussed before, and it remains only to be pointed out that for packages which, as in sausage casings, are subjected to the influence of heat, for example during sterilization, it is advisable to use layers or sprayed-on films of molecularly oriented thermoplastic material which has been thermally tempered and is thus stabilized against shrinkage under the influence of heat. It will be understood that the plastic material in such laminated foils in which a metal layer is sandwiched between two layers of plastic, should be compatible, if not identical. If the embodiment of FIG. 4 is employed, that is if the inner surface of one edge portion is secured to the inner surface of another edge portion, so that there is no contact of inner surface against outer surface, then the plastic materials of the two layers need not be compatible and all plastics which are capable of withstanding sterilization, even if they are not of the thermoplastic type, can be used. It is then also possible to use suitable lacquers as the outer layer.

Sealing along the main seams can be accomplished with any of the various known methods, for example heat sealing, impulse welding, inductive high frequency welding, and similar methods. If capacitive high frequency welding is to be employed, then the embodiment of FIG. 6 will be used, that is at least one of the edge portions will not contain the metallic layer.

It will be understood that each of the elements described above, or two or more together, may also find a useful application in other types of a method of joining plastic materials differing from the types described above.

While the invention has been illustrated and described as embodied in packages, such as sausage casings, it is not intended to be limited to the details shown, since various modifications and structural changes may be made without departing in any way from the spirit of the present invention.

What is claimed as new and desired to be secured by Letters Patent is:

1. As a novel article of manufacture, an elongated sleeve of laminated material including at least one layer of metallic material and at least one superposed layer of fusible plastic material having marginal portions overlapping one another, said sleeve comprising a composite elongated seam including at least one main seam obtained by direct application of heat to said overlapping marginal portions, and at least one discrete secondary seam extending along said main seam and obtained by fusion of said plastic material in response to transfer of heat from the adjoining main seam and pressure applied against said plastic material in the region of said secondary seam during such fusion.

2. A method of joining portions of fusible plastic material, comprising the steps of overlapping one of said portions in face-to-face contact with another of said portions to form a laminated structure of a predetermined first width; directly applying heat to a zone of said laminated structure having a second width appreciably smaller than said predetermined first width and being inwardly spaced from both edges of said laminated structure so as to weld said portions together in said zone and to thus form a main seam while the material adjoining said main seam and whose total width corresponds to the difference between said first and second widths is simultaneously brought into fusible state by transfer of heat from said zone; and maintaining such material of the overlapping portions in pressure contact while in fusible state so as to form secondary seams adjacent to and on both sides of said main seam without substantially softening the fusible plastic material beyond said laminated structure thereof.

3. A method as defined in claim 2, wherein said portions constitute marginal portions of an elongated web.

4. A method as defined in claim 2, wherein said portions constitute marginal portions of an elongated laminated web.

5. A method as defined in claim 3, and further comprising the step of arcuately deforming said web so as to form a tubular sleeve prior to placing of said portions in overlapping contact.

6. A method as defined in claim 4, wherein an inner face of one of said portions is placed in face-to-face contact with an outer face of the other of said portions.

7. A method as defined in claim 4, wherein an inner face of one of said portions is placed in face-to-face contact with an inner face of the other of said portions.

8. A method as defined in claim 5, wherein said one portion is provided on one layer of said laminated web, and said other portion is provided on another layer of said laminated web.

9. A method as defined in claim 2, wherein said portions constitute marginal portions of an elongated laminated web including a layer of metallic material sandwiched between two layers of fusible plastic material.

10. A method as defined in claim 8, and further comprising the steps of arcuately deforming said laminated web so as to form a tubular sleeve prior to placing of said portions in face-to-face contact.

11. A method as defined in claim 2, wherein said portions constitute marginal portions of an elongated laminated web including a layer of metallic material sandwiched between two layers of fusible plastic material and terminating short of at least one of said marginal portions of the latter.

12. A method as defined in claim 8, wherein said layers of fusible plastic material have compatible characteristics.

13. A method as defined in claim 8, wherein one of said layers of fusible plastic material is of a type different from the other, but wherein said layers have compatible characteristics.

14. A method as defined in claim 3, wherein said main seam is formed by high-frequency welding.

15. A method as defined in claim 2, comprising the initial step of providing a laminated web by adhering a layer of said fusible plastic material to at least one side of a sheet of metallic material.

16. A method as defined in claim 4, and further comprising the steps of closing the axial ends of said tubular sleeve.

17. A method as defined in claim 4, and further comprising the step of forming an additional main seam and secondary seam adjacent and parallel to the first-mentioned main and secondary seam.

18. A method as defined in claim 16, wherein the respective secondary seams each comprise two portions respectively located on opposite sides of the associated main seam, and wherein said additional main seam is spaced from said first-mentioned main seam so that the portions of the secondary seams which are located intermediate said main seams overlap one another.

References Cited

UNITED STATES PATENTS

| | | | |
|---|---|---|---|
| 2,459,260 | 1/1949 | Brown | 156—380 XR |
| 2,484,076 | 10/1949 | Collins | 156—380 |
| 2,679,968 | 6/1954 | Richter | 156—203 XR |
| 2,751,965 | 6/1956 | Miller | 156—380 XR |
| 2,757,495 | 8/1956 | Reichel | 156—203 |
| 2,773,773 | 12/1956 | Harder et al. | 156—203 XR |
| 3,056,339 | 10/1962 | Sommerfeld et al. | 156—203 XR |
| 3,066,721 | 12/1962 | Levy | 156—203 XR |
| 3,078,201 | 2/1963 | Christie | 161—216 XR |
| 3,388,017 | 6/1968 | Grimsley et al. | 156—203 |

JOHN T. GOOLKASIAN, Primary Examiner

G. W. MOXON II, Assistant Examiner

U.S. Cl. X.R.

156—200, 203, 218